US008914680B2

(12) United States Patent
Bello et al.

(10) Patent No.: US 8,914,680 B2
(45) Date of Patent: Dec. 16, 2014

(54) RESOLUTION OF SYSTEM HANG DUE TO FILESYSTEM CORRUPTION (75) Inventors: Adekunle Bello, Austin, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 13/539,673

(22) Filed: Jul. 2, 2012

(65) Prior Publication Data
US 2014/0006854 A1    Jan. 2, 2014

(51) Int. Cl.
*G06F 11/00* (2006.01)
(52) U.S. Cl.
USPC .............. 714/38.1; 714/49; 714/54
(58) Field of Classification Search
None
See application file for complete search history.

(56) References Cited

U.S. PATENT DOCUMENTS

| 7,047,403 | B2 | 5/2006 | Lin |
| 7,941,403 | B2 | 5/2011 | Scott |
| 2004/0225922 | A1* | 11/2004 | Susarla et al. ............... 714/38 |
| 2005/0097141 | A1* | 5/2005 | Loafman et al. ........... 707/200 |
| 2006/0150037 | A1 | 7/2006 | Wang |
| 2006/0161988 | A1 | 7/2006 | Costea |
| 2010/0235617 | A1 | 9/2010 | Chen |
| 2011/0209156 | A1 | 8/2011 | Box et al. |

FOREIGN PATENT DOCUMENTS

WO    WO2010050944    5/2010

OTHER PUBLICATIONS

PUBLIB; "JFS and JFS2"; retrieved on Jun. 13, 2012 from http://publib.boulder.ibm.com/infocenter/pseries/v5r3/topic/com.ibm.aix.

* cited by examiner

*Primary Examiner* — Scott Baderman
*Assistant Examiner* — Jason Bryan
(74) *Attorney, Agent, or Firm* — Robert H. Frantz; Damion Josephs (57) ABSTRACT

File system errors are handled and computing systems are recovered by, responsive to receiving a page buffer request, initializing a sleep timer according to a detection interval value plus a hang resolution range value; responsive to the timer expiring, detecting that a process, thread, application program, daemon, or task is waiting on availability of the requested page buffer; and responsive to the detection, quarantining metadata associated with the requested page buffer, failing the page buffer request and releasing one or more locks on the requested page buffer. This process is then optionally repeated for additional processes, threads, application programs, daemons, tasks or combinations thereof which are waiting for availability of the requested page buffer, optionally randomizing the detection interval value in order to avoid an instantaneous recovery from the error.

15 Claims, 5 Drawing Sheets

RESOLUTION OF SYSTEM HANG DUE TO FILESYSTEM CORRUPTION

FIELD OF THE INVENTION

The invention generally relates to methods for detecting and recovering from errors in computer file systems.

BACKGROUND OF INVENTION

Journaled or Journaling File Systems (JFS) are well known in the art as some of the most robust file systems available. Operating systems such as UNIX, LINUX, International Business Machines' (IBM's) AIX™ and Apple Computer's Mac OS X™ are a few operating systems which include journaling.

Generally speaking, a non-journaling filesystem simply executes a series of operations on a file without tracking the changes. So, a file change that requires several sequential operations is susceptible to filesystem corruption if an error occurs between any of the steps. For example, when a program is closing down, several steps may be required to delete the files, blocks or sectors which it was using, followed by marking the freed-up space for re-allocation in an allocation structure such as a file allocation table. If there is a power failure, reboot or other anomaly in operation between the step of deleting files and marking the freed-up space as being available, the latter operations may not occur and thus memory is "lost" and unavailable for future programs to use.

Over time and through several of these types of errors, usable space may eventually become constrained.

A journaling file system keeps a journal of file operations to perform, including which operations have been performed and which operations are yet to be performed. If an operational anomaly occurs during a sequence of related file actions (read, write, rename, re-allocate, etc.), then upon recovery (reboot, restart, etc.), the operating system can review the status of all entries in the journal and complete any operations which are pending but incomplete.

Without using terminology which is specific to a particular operating system, the journals can be classified into two general types—physical journals and logical journals. The former tracks all changes to all blocks, while the latter tracks only changes to metadata. The former is more fault tolerant than the latter, but the latter imposes less of a performance burden than the former but does not provide as robust fault tolerance.

SUMMARY OF EXEMPLARY EMBODIMENTS OF THE INVENTION

File system errors are handled and computing systems are recovered by, responsive to receiving a page buffer request, initializing a sleep timer according to a detection interval value plus a hang resolution range value; responsive to the timer expiring, detecting that a process, thread, application program, daemon, or task is waiting on availability of the requested page buffer; and responsive to the detection, quarantining metadata associated with the requested page buffer, failing the page buffer request and releasing one or more locks on the requested page buffer. This process is then optionally repeated for additional a processes, threads, application programs, daemons, tasks or combinations thereof which are waiting for availability of the requested page buffer, optionally randomizing the detection interval value in order to avoid an instantaneous recovery from the error.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

The inventors of the present and the related invention have recognized problems not yet recognized by those skilled in the relevant arts regarding the reasons for system hangs or freezes in computing systems which employ operating systems with journaling file systems, and a lack of acceptable recovery methods. In journaling filesystems such IBM's AIX JFS2™, both userdata (file blocks) and metadata blocks are organized in tangible, computer-readable memory storage devices using page buffers. Depending on the pattern of usage by the operating system and the application program(s) running on the computing platform, a number of process threads may end up waiting for a page buffer that has been left in an invalid state and thus will never be released. Such situation could have disastrous effect on workloads running on such a system, for example, it could cause a critical workload to stop responding to user inputs or could even trigger a failover in a high availability cluster setup. For the purposes of this disclosure, we will refer to this condition as a system hang, where others may use similar terms such as a freeze or lock up.

In such situations, it becomes crucial to detect such a state and provide a means to resolve it with minimal disruption. While identifying and removing all root causes of system hang and data corruption would be ideal if possible, it is a fact that this is impractical given the nature of filesystems, e.g. they sit on IO (input/output) resources such as disk and logical volumes that create potential for corruptions, and what is more is a filesystem is usually busy directly manipulating memory pages hosting both user data and metadata which further increases this potential corruption.

One "easy" solution is to crash the computing platform when such corruption is observed. This forces a reboot of the entire computing platform, including re-initializing the file system which releases any locks on files and/or restarts any process threads which were previously waiting on locks to be released. This is not, however, a preferred solution because in a computing environment where "up time" is critical, back up computing resources must be provided, and active workload must be transferred to a backup system prior to crashing the computing platform which is experiencing the problem. This adds cost and complexity to the overall computing environment.

However, a more practical option is try to recover from such filesystem corruption or system hang with minimal disruption. This is known as filesystem hardening, in general, and is the type of solution proposed in the present disclosure.

One method in the prior art to harden a filesystem proposes a method of dividing a file system into multiple segments, then using a filesystem checker (fsck) to check for inconsistencies in one of the multiple segments while the file system remains online and available for use, and using the fsck to correct an inconsistency discovered in the one of the multiple segments while the file system remains online and available for use.

Another method in the prior art proposes techniques for filesystem recovery on embedded systems where the memory may be arranged to store a file system manager module (FSMM) that when executed by the processor manages an Embedded File System (EFS). The FSMM may create a factory image of the EFS on a periodic basis, or in response to a specific event such as a power down event. The FSMM may detect an error condition for the EFS, and replace the EFS with the factory image when an error is detected. The method proposes a drastic measure such as rebooting the system, and while this may be acceptable in embedded systems, it is obviously a very disruptive measure on production computing systems running critical workload that ill-afford significant (or any) down time.

Neither of these proposed methods address the problem of detecting a system hang situation due to filesystem corruption as described in the present disclosure. However, it is imaginable that one or both of these methods may be used in concert with the solutions provided by the present inventors, as will be discussed in subsequent paragraphs.

In particular, embodiments of the present invention identify a potential system hang situation that arises when a filesystem page buffer holding a file block or metadata gets corrupted. In a typical scenario, a thread holding some locks goes to sleep waiting for a page buffer to become available. Meanwhile, another thread has manipulated this page buffer putting it in an invalid state, for example setting a flag that the buffer is in use when in reality it is not. This will cause the first thread to wait indefinitely, and still other threads waiting for the lock(s) it is holding cannot proceed.

To detect a situation like this, a user-configurable interval is defined which controls how long a thread is allowed to sleep. If a thread does not return from sleep within the allowed interval, it is pre-empted and forced to release its filesystem lock(s). On pre-emption, the file operation is abandoned and the file involved is then quarantined. Such fenced off metadata region is then passed through an online filesystem check (fsck) facility to try to repair it. Because there could be a large number of threads sleeping on a page buffer, some embodiments according to the present invention allow the waiting threads to wake up at different intervals, thus spreading out the hang resolution time and avoiding coming out of one hang only to immediately run into another choke situation.

At least one point of novelty of embodiments of the present invention is in identifying potential hang situations and reacting to quickly quarantine a corrupted file's metadata without bringing down the system. In today's environments which require very tight Service Level Agreements (SLA's), computing system downtime can be very expensive, so rather than crash a system due to some corruption, it is much more preferably to first determine if such corruption could be isolated with little consequence. It is undesirable to crash a system just because the metadata of a non-essential log file somehow became corrupted.

Exemplary Logical Processes According to the Invention. Logical processes which implement the method of the present invention may be realized as computer program instructions on a tangible, computer-readable storage memory device which are executable by a computer processor, or as a processor executing such program instructions.

File operations such as deleting, truncating or reading/writing a file involve at least two processor operational steps, taking a lock on the file inode (and possibly the directory inode) and assigning a page buffer to hold the pages in memory. After obtaining a page buffer, it is first put it into an "in-use" mode (for example set a PB_INUSE flag and increment a pb_count value) before reading data from disk into memory. Until the page buffer becomes available, threads working on the same file or in the same directory will be held up when they try to get the file/directory inode locks. So there are two sets of waiters: (1) those threads which are directly waiting for page buffers to become available (we'll call them buf_waiters), and those threads which are queuing behind them waiting for inode locks to be freed (we will refer to these threads as lock_waiters).

For a file with thousands of threads accessing it, the page buffers holding both userdata and metadata are constantly moving between in-use and free state, dramatically increasing the potential that a free page buffer is left in an in-use state. When this condition occurs, a hang situation is highly likely nad possibly even inevitable.

So, an initial step in a logical process according to the present invention is to define how to detect a potential hang situation. As indicated above, this is when a thread could go to sleep while holding some crucial locks such as the file inode lock or directory inode lock. According to the invention, such logical processes define a flag HANG_POTENTIAL that is passed with the page buffer request if such locks are held. Also, such logical processes define a set of interval variables, page_buf_hang_detect_interval and page_buf_hang_resolve_range, preferably with initial default values. The default can be set to some other user-defined values by the system administrator as deemed appropriate. In this example, we use page_buf_hang_detect_interval to define the minimum sleep time for a buf_waiter thread, and page_buf_hang_resolve_range to spread the wake up time to avoid waking up lock sleepers threads all at once.

Figure 1:
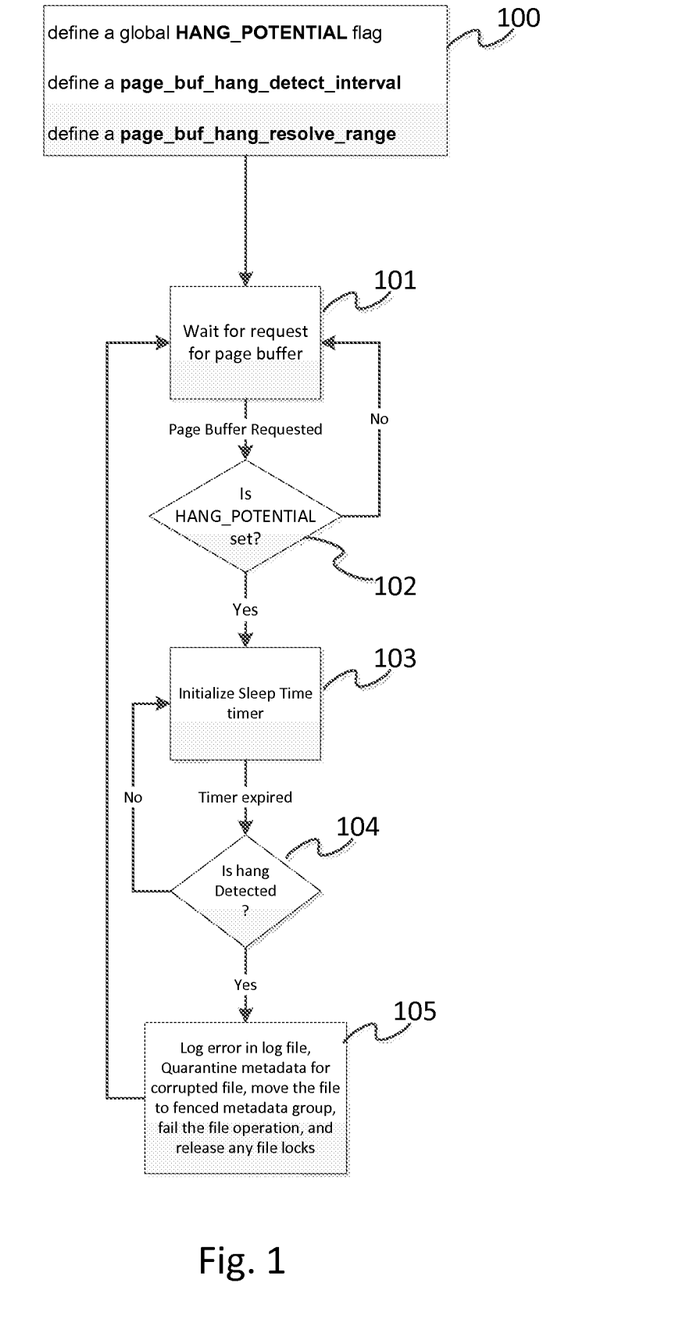
FIG. 1 illustrates a logical process according to the present invention.

Subsequently to defining the interval variables or to setting them to default values, when a hang situation is detected, an error is logged, and the metadata for the target file is quarantined and added to a fenced metadata group. An online filesystem check (fsck) can then be run against the fenced metadata. FIG. 1 illustrates such a logical process. As previously mentioned, the process initializes values for a global hang potential enabling flag, for a page buffer hang detection interval value, and for a page buffer hang resolution range value (100). Subsequently, when a request for page buffer is to be made (101), the logical process checks (102) if the hang potential enabling flag is set (enabled), and if so, a timer with sleep time set (103) to a value such as the page buffer hang detection interval value times a randomly generated value between zero and one times the page buffer hang resolution value.

If a hang situation is detected (104) when above timer expires, then (105):
1) an error is logged in the errlog file or some other error notification, e.g. via an email to a systems administration group account;
2) the metadata of the file is set to a QUARANTINED state;
3) the file is moved to a fenced metadata group; and
4) the file operation is failed and any lock(s) is(are) released.

After completing the failing of the file operation and releasing of the locks, the potential of rushing into another hang state as potentially thousands of threads race to make similar call is reduced because the sleeping threads are woken up at different times by using the randomized value multiplied by the page buffer hang resolution range value. Moreover, any operation targeting the same file will immediately fail because the file has been set in QUARANTINED state.

Figure 2A:
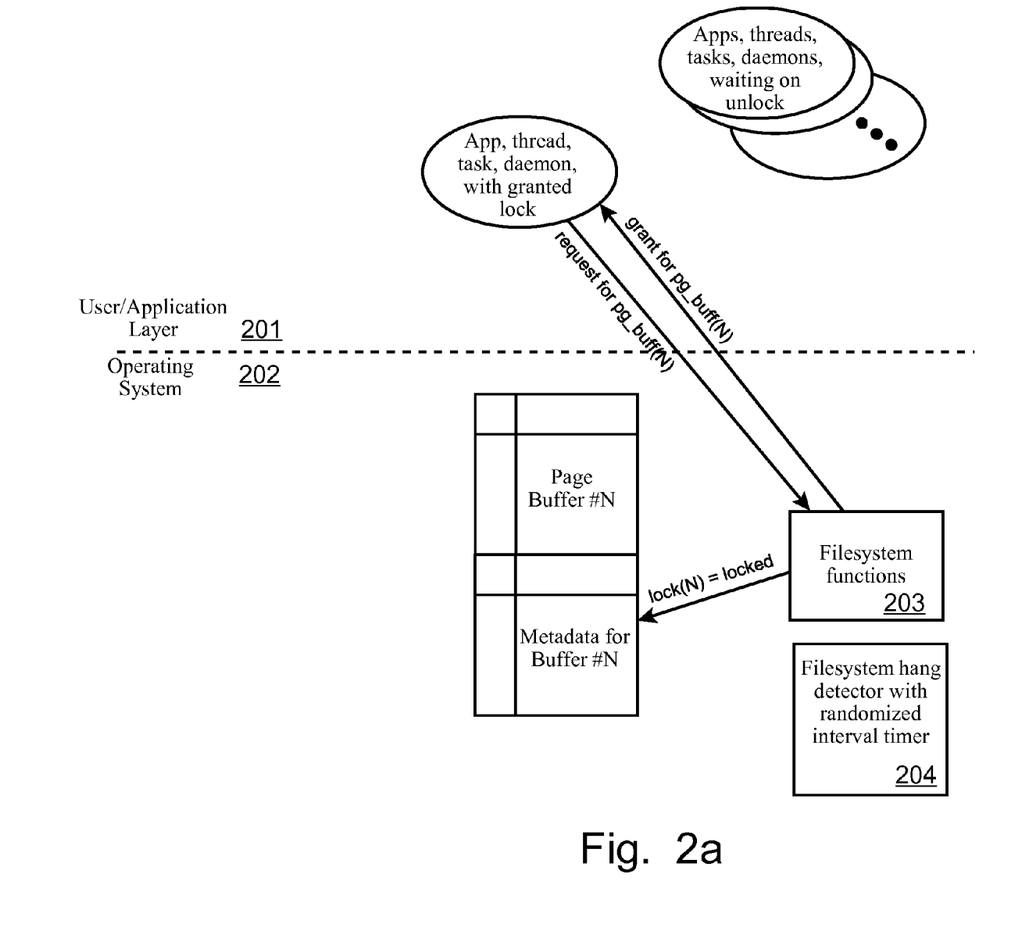
FIGS. 2a, b and c illustrate the functional activities according to the present invention.

Referring now to FIG. 2a, some of the key activities of an embodiment of the present invention are depicted, in which an application program thread, task, or daemon in the application layer (201) of a computing system requests access for IO (read, write, move, etc.) from the operating system (202) filesystem (203). If the requested page buffer is available (and unlocked), the request is granted, and the metadata for the requested page buffer is modified to show that the page buffer is locked.

Figure 2B:
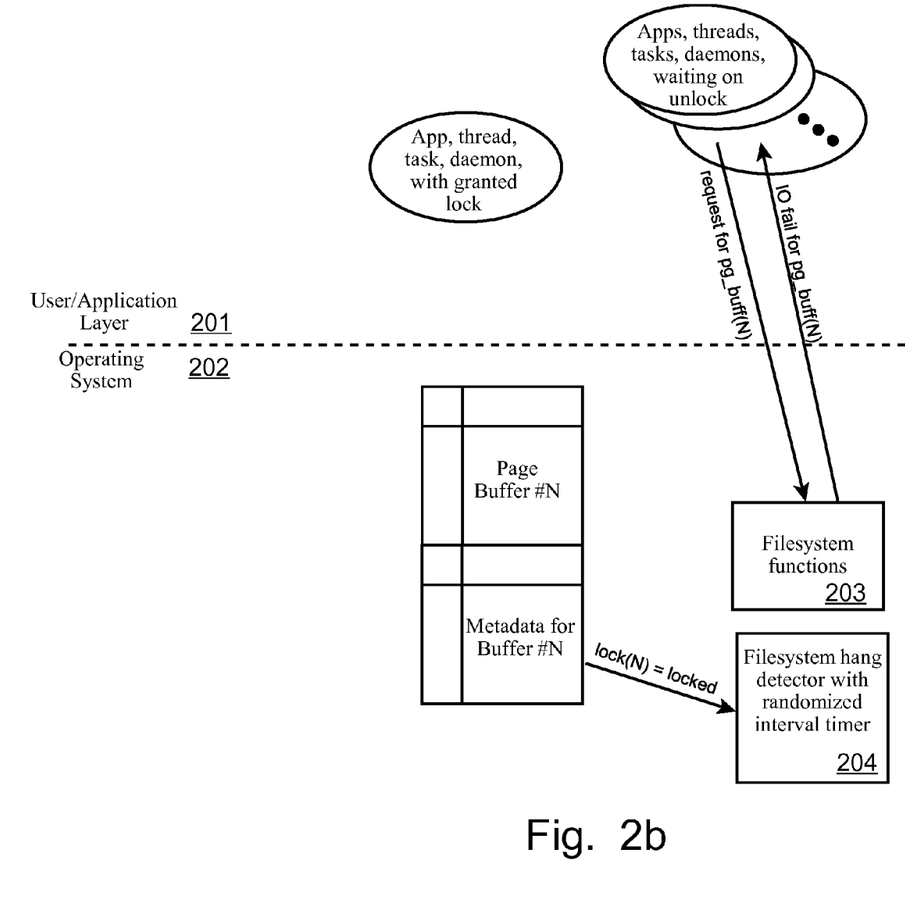

As shown in FIG. 2b, one or more additional application programs, tasks, threads, daemons, etc., may request access to the same file, page buffer, block, sector, etc., and begin to wait on its availability, as it is currently locked. The filesystem hang detector and recovery function (204) according to the present invention will, upon expiration of the interval timer, note that the page buffer in question is still locked.

Figure 2C:
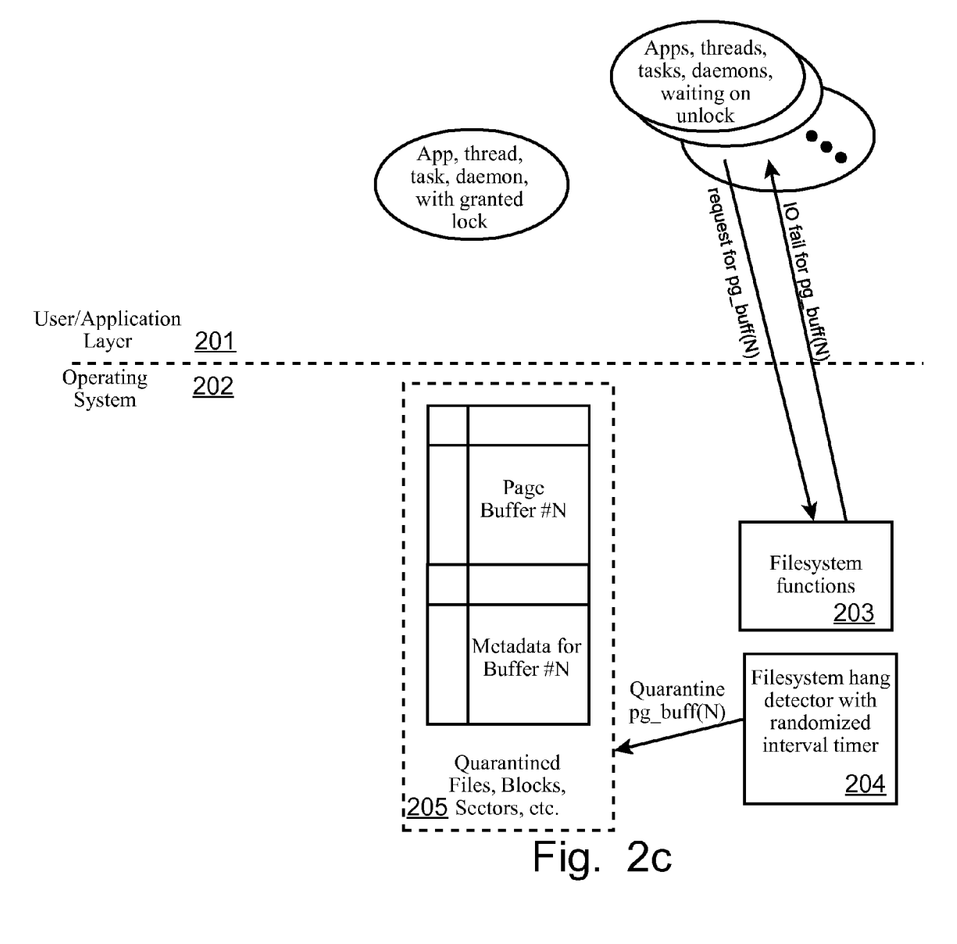

In FIG. 2c, the additional application programs tasks, threads, daemons, etc., are given an IO failure so that they will stop waiting on the availability of the page buffer, and the new function (204) will place the page buffer into quarantine (205) for subsequent handling such as deletion, repair, etc.

User level service. According to the present invention, the files in the fenced metadata group are exposed via a user-level interface, so that a system administrator can take appropriate action. On notification, a system administrator can examine the files in the fenced metadata group, and either delete them or run an online filesystem check (fsck) tool to repair them.

Filesystem and Application Layer Interactions. According to another aspect of embodiments of the present invention, there is provided a new method regarding how IO's targeting a quarantined metadata area are handled between the application layer and the filesystem module. A new flag is introduced, which we will refer to as "FIGNORE", that when set on a file's inode indicates that an EIGNORE error should be passed up to the application when a file is quarantined. Thus, an application will set the "FIGNORE" flag as part of the open call to inform the filesystem layer that it wants to be informed of metadata errors. So when a hang situation is detected, and the target file has the "FIGNORE" flag set, embodiments of the invention return EIGNORE back to the application. One may view the new FIGNORE flag as a mechanism through which the application layer may indicate that a file or set of file is or are enabled to participate in the new hang detection process. In at least one exemplary embodiment, only files with this flag set are subject to the rigor of the new process.

EIGNORE, on the other hand, is what an operating system such as the system kernel of AIX will pass back to the application program when a hang situation is detected. This is introduced into these embodiments to make sure both the operating system and the application program are using a corrupted file handle the hang state properly. Thus, when the operating system detects a possible hang situation, it performs the procedure previously described, and then it passes back the EIGNORE error to the application that was waiting for the read or write against that corrupted file. The application program can then cancel pending reads/writes that it is yet to send down to the operating system.

Such an application may respond by performing its coded method to handle EIGNORE error, for example by creating a new file, without disrupting normal operations. The beauty of this approach is that IO's to a fenced-off metadata section are completely quiesced from the application layer once an EIGNORE is delivered, thus preventing a possible recurring IO call/failure loop.

Experience has shown that most files that end up in a hang state are log files, so we foresee an application making use of this feature by creating a new log file when it gets an EIGNORE on its current log file. Of course, this ignore feature is not limited to log files, whereas the applications could set FIGNORE flag for other files that it considers "ignorable" without major impact to application behavior. Finally, one other potential enhancement is to move the EIGNORE flag to the directory level so that files under a directory inherits this flag.

With this approach, the application only needs to set the FIGNORE flag on its log directory, so that any log file it opens or creates in this directory automatically inherits the FIGNORE flag.

Other Embodiments and Other Operating Systems. The foregoing paragraphs have set forth example embodiments of the invention using IBM AIX™ operating system terminology, and with reference in particular to page buffer (pgbuf) structures as found in AIX. While describing these target scenarios, we have used the notion of a pgbuf struct for manipulating metadata in the target filesystem. It will be recognized by those skill in the art that the utility of other embodiments of the invention is not limited to AIX and its specifics, but that it may be advantageously applied in other operating systems and other structures for manipulating metadata in typical filesystems.

For example, filesystems on Linux and Solaris™ use similar buffer structures for handling filesystem metadata which would benefit from the inventive methods set forth herein.

Similarly, the use of such pgbuf structs is not only for metadata, as opposed to userdata, IO. The methods described herein can detect and close off the metadata for one or more filesystem resources effectively stopping and failing back any userdata IO against such resources, and cancelling pending IOs on them.

Suitable Computing Platform. The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 3:
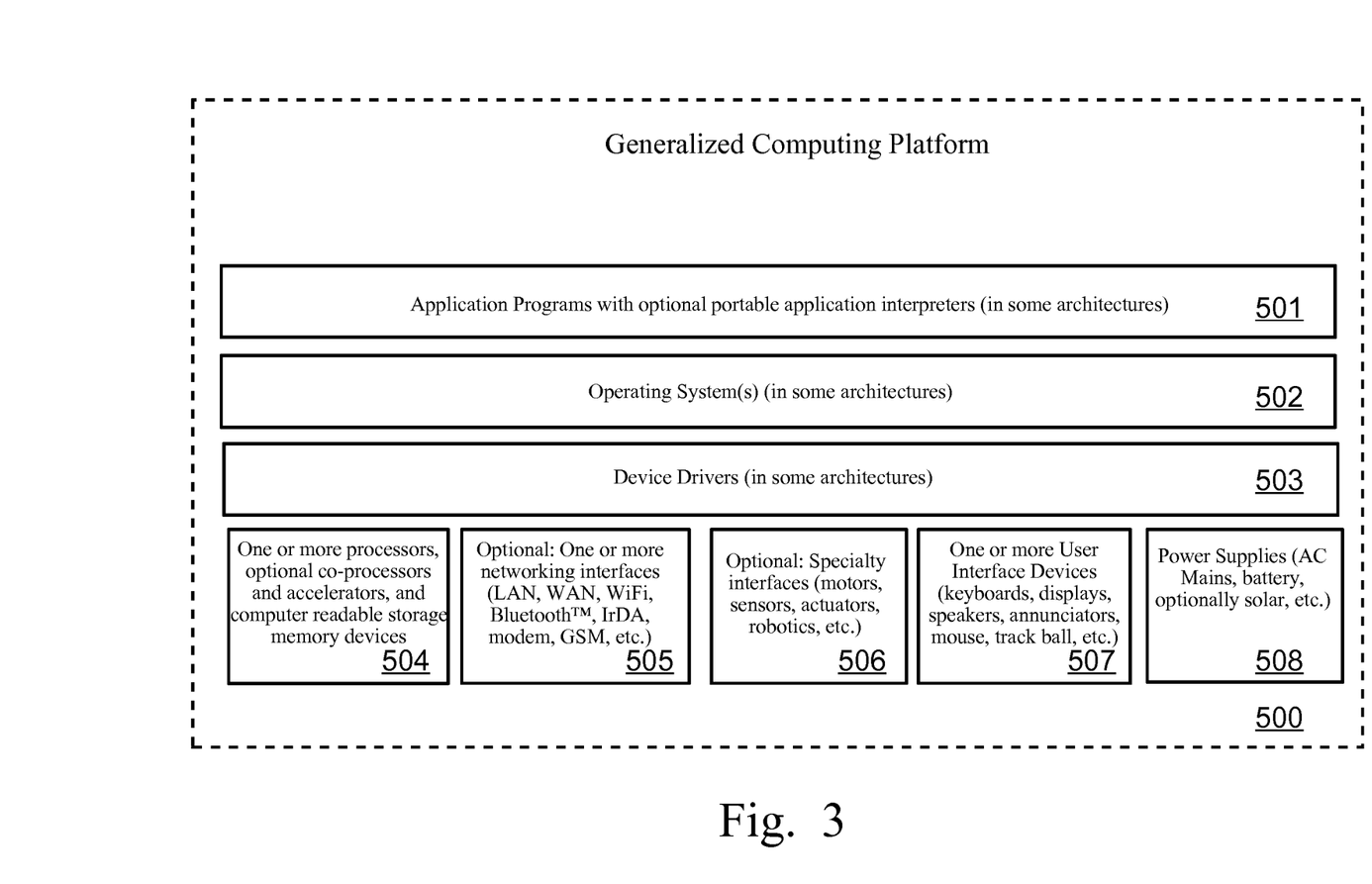
FIG. 3 sets forth a generalized computing platform suitable for realization of at least one embodiment of the present invention.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for handling and recovering from file system errors in a computing system comprising:
    defining by a processor a flag to enable handling potential hang up scenarios;
    defining by a processor a hang detection interval value;
    defining by a processor a hang resolution range value;
    responsive to receiving a page buffer request, and responsive to the enablement flag being enabled, initializing a sleep timer according to the detection interval value plus the hang resolution range value;
    responsive to the timer expiring, detecting by a processor that a process, thread, application program, daemon, or task is waiting on availability of the requested page buffer; and
    responsive to the detection, quarantining metadata by the processor associated with the requested page buffer, failing the page buffer request and releasing one or more locks on the requested page buffer.

2. The method as set forth in claim 1 in which the initializing a sleep timer, detecting waiting on the requested page buffer, quarantining and releasing are repeated for one or more additional processes, threads, application programs, daemons, tasks, or combinations thereof.

3. The method as set forth in claim 2 wherein the initializing of a sleep timer comprises initializing a timer to a randomly determined portion of the detection interval value such that each additional process, thread, application program, daemon, and task is released from waiting upon the requested page buffer on randomized intervals.

4. The method as set forth in claim 1 further comprising, responsive to the detection, logging an error into an error log or notifying a systems administration console of an error.

5. The method as set forth in claim 1 further comprising providing an error handling flag cooperative between an application layer and an operating system of a computing system, wherein the error handling flag is employed to pass error handling control from the operating system to an application program responsive to the detecting.

6. A system for handling and recovering from file system errors in a computing system comprising:
    a processor for performing a logical process;
    at least one computer-readable storage memory device;
    a flag disposed in the at least one computer-readable storage memory device to enable handling potential hang up scenarios;
    a hang detection interval value disposed in the at least one computer-readable storage memory device;
    a hang resolution range value disposed in the at least one computer-readable storage memory device; and
    one or more program instructions disposed in the computer-readable storage memory device for causing the processor to perform operations comprising:
        responsive to receiving a page buffer request, and responsive to the enablement flag being enabled, initializing a sleep timer according to the detection interval value plus the hang resolution range value;
        responsive to the timer expiring, detecting that a process, thread, application program, daemon, or task is waiting on availability of the requested page buffer; and
        responsive to the detection, quarantining metadata associated with the requested page buffer, failing the page buffer request and releasing one or more locks on the requested page buffer;
    wherein the at least one computer-readable storage memory device is not a transitory signal per se.

7. The system as set forth in claim 6 in which the program instructions to perform the sleep timer, detecting and quarantininq are performed repeatedly to release one or more additional processes, threads, application programs, daemons, tasks, or combinations thereof, from waiting on the requested page buffer.

8. The system as set forth in claim 7 wherein the sleep timer is initialized to a randomly determined portion of the detection interval value such that each additional process, thread, application program, daemon, and task is released from waiting upon the requested page buffer on randomized intervals.

9. The system as set forth in claim 6 wherein the program instructions further comprise program instructions to provide an error logger/notifier for, responsive to the detection, logging an error into an error log or for notifying a systems administration console of an error.

10. The system as set forth in claim 6 wherein the program instructions further comprise program instructions for providing and accessing an error handling flag provided within the at least one computer-readable storage memory device, the flag being cooperative between an application layer and an operating system of a computing system, wherein the error handling flag is employed to pass error handling control from the operating system to an application program responsive to the detecting.

11. A computer program product for handling and recovering from file system errors in a computing system comprising:
   a flag to enable handling potential hang up scenarios;
   a hang detection interval value;
   a hang resolution range value;
   first program instructions for, responsive to receiving a page buffer request, and responsive to the enablement flag being enabled, initializing a sleep timer according to the detection interval value plus the hang resolution range value;
   second program instructions for, responsive to the timer expiring, detecting that a process, thread, application program, daemon, or task is waiting on availability of the requested page buffer; and
   third program instructions for, responsive to the detection, quarantining metadata by the processor associated with the requested page buffer, failing the page buffer request and releasing one or more locks on the requested page buffer;
   wherein the a enablement flag, the hang detection interval value, the hang resolution range value, and the first, second and third program instructions are stored by at least one computer-readable storage memory device which is not a transitory signal per se.

12. The computer program product as set forth in claim 11 in which the initializing a sleep timer, detecting waiting on the requested page buffer, quarantining and releasing are repeated by the program instructions for one or more additional processes, threads, application programs, daemons, tasks, or combinations thereof.

13. The computer program product as set forth in claim 12 wherein the initializing of a sleep timer comprises initializing a timer to a randomly determined portion of the detection interval value such that each additional process, thread, application program, daemon, and task is released from waiting upon the requested page buffer on randomized intervals.

14. The computer program product as set forth in claim 11 further comprising fourth program instructions for, responsive to the detection, logging an error into an error log or notifying a systems administration console of an error, wherein the fourth program instructions are stored by a tangible, computer-readable storage memory device.

15. The computer program product as set forth in claim 11 further comprising an error handling flag provided into a tangible, computer-readable storage memory device, cooperative between an application layer and an operating system of a computing system, wherein the error handling flag is employed to pass error handling control from the operating system to an application program responsive to the detecting.

* * * * *